United States Patent
Chien et al.

(10) Patent No.: US 8,224,701 B2
(45) Date of Patent: Jul. 17, 2012

(54) DETECTING DEVICE FOR A CASH DRAWER AND A POINT OF SALES SYSTEM

(75) Inventors: Yu-Feng Chien, Rueifang Township, Taipei County (TW); Yen-Yi Wei, Taipei (TW); Yi-Ming Lin, Sindian (TW); Meng-Yuan Tsai, Cingshuei Township, Taichung County (TW)

(73) Assignees: Universal Scientific Industrial (Shanghai) Co., Ltd., Shanghai (CN); Universal Global Scientific Industrial Co., Ltd., Nantou County (TW)

( * ) Notice: Subject to any disclaimer, the term of this patent is extended or adjusted under 35 U.S.C. 154(b) by 280 days.

(21) Appl. No.: 12/155,279

(22) Filed: Jun. 2, 2008

(65) Prior Publication Data
US 2009/0299866 A1     Dec. 3, 2009

(51) Int. Cl.
*G06Q 20/00*     (2012.01)
(52) U.S. Cl. .......................................... 705/21
(58) Field of Classification Search ................... 343/741; 705/21
See application file for complete search history.

(56) References Cited

U.S. PATENT DOCUMENTS
2008/0246675 A1 * 10/2008 Folcke et al. ................. 343/741
* cited by examiner Primary Examiner — Russell S Glass
(74) Attorney, Agent, or Firm — Rosenberg, Klein & Lee

(57) ABSTRACT

A detecting device for a cash drawer is used for detecting a status of the cash drawer. The detecting device includes an operation logic circuit and a switch element. The operation logic circuit has a first input terminal, a second input terminal and an output terminal. The first input terminal and the second input terminal are respectively coupled with a micro switch. The first input terminal and the second input terminal are respectively inputted with a high level voltage. When the first input terminal and the second input terminal have the same logic voltage levels, the operation logic circuit outputs a first logic level to the output terminal. When the first input terminal and the second input terminal have different logic voltage levels, the operation logic circuit outputs a second logic level to the output terminal. The switch element is coupled between an electromagnetic switch and the first input terminal.

5 Claims, 4 Drawing Sheets

DETECTING DEVICE FOR A CASH DRAWER AND A POINT OF SALES SYSTEM

BACKGROUND OF THE INVENTION

1. Field of the Invention

The present invention relates to a detecting device. In particular, this invention relates to a detecting device that detects whether a cash drawer is opened or closed.

2. Description of the Related Art

In retail stores, usually electronic ways are used to manage the payment for goods, such as point of sales (POS) systems. FIG. 1 shows a typical point of sales system. The POS includes a control host 1, and a cash drawer 2. The control host 1 provides a lot of basic functions, such as inputting price, calculating the total payments for goods, printing the receipt, and displaying the payments for goods, etc. The control host 1 also controls the cash drawer 2 to be opened via an electronic way so that the cash can be put into the cash drawer 2 or take out from the cash drawer 2.

The functional block of the point of sales system in FIG. 1 is shown in FIG. 2. In FIG. 2, the control host 1 controls a display unit 13, an operation unit 15 and a printing unit 17 via a control unit 11. At the same time, the control unit 11 uses a pin GPOUT to drive the electromagnetic switch 23 to be enabled and uses a pin GPIN to detect whether the cash drawer 2 is opened or not. The cash drawer 2 includes a housing 21 having an electromagnetic switch 23, a micro switch 24, and a drawer 22 that can be opened or closed for storing the cash. In the drawer 22, there is an induction driving circuit 221 that can automatically open the drawer 22 from the housing 21 when the electromagnetic switch 23 is enabled. Between the control host 1 and the cash drawer 2, there is a connection wire 25 for transmitting the signals.

Therefore, when the control unit 11 outputs a low level signal to enable the electromagnetic switch 23 via the pin GPOUT so that the drawer 22 is automatically opened and the micro switch 24 is sort-circuit, the control unit 11 detects a low level signal from the pin GPIN and confirms that the cash drawer 2 is in an opened status. At this time, the control unit 11 displays the information of the cash drawer 2 being opened on the display unit 13. On the contrary, when the cash drawer 2 is in the closed status (this means that the drawer 22 is closed in the housing 21), the micro switch 24 in the cash drawer 2 is open-circuit. Therefore, the control unit 11 detects a high level signal from the pin GPIN and confirms that the cash drawer 2 is in the closed status. Similarly, the control unit 11 displays the information of the cash drawer 2 being closed on the display unit 13.

However, when the cash drawer 2 is stolen or moved, the signal connection between the cash drawer 2 and the control host 1 is interrupted. At this time, the control unit 11 still detects a high level signal from the pin GPIN, and confirms that the cash drawer 2 is in the normal closed status. Therefore, the point of sales system of the prior art cannot show that status of the cash drawer 2 being stolen or moved. It has a cash-loss risk for the owner of the store.

SUMMARY OF THE INVENTION

One particular aspect of the present invention is to solve the problem that the point of sales system of the prior art cannot show that real status when the cash drawer is stolen or moved.

Another particular aspect of the present invention is to provide a detecting device for a cash drawer and a point of sales system. It uses a circuit design to confirm that the cash drawer is in the opened status when the cash drawer is stolen or moved. By utilizing this design, the user can monitor the real status of the cash drawer.

The detecting device for a cash drawer is disclosed. The cash drawer has an electromagnetic switch and a micro switch, and is connected with a control host via a connection wire to obtain an operation power for the electromagnetic switch. The detecting device for a cash drawer is located in the control host and includes an operation logic circuit and a switch element. The operation logic circuit has a first input terminal, a second input terminal and an output terminal. The first input terminal is coupled with a first terminal of the micro switch. The second input terminal is coupled with a second terminal of the micro switch. The first input terminal and the second input terminal are respectively inputted with a high level voltage. When the first input terminal and the second input terminal have the same logic voltage levels, the operation logic circuit outputs a first logic level to the output terminal. When the first input terminal and the second input terminal have different logic voltage levels, the operation logic circuit outputs a second logic level to the output terminal. The switch element is coupled between the electromagnetic switch and the first input terminal, and the conduction of the switch element is achieved by obtaining the operation power via the electromagnetic switch. When the switch element is conducted, the switch element outputs a low level voltage to the output terminal.

In one embodiment, the operation logic circuit is an XOR gate, or an XNOR gate.

By utilizing the above device, when the cash drawer is stolen or moved, the detecting device for a cash drawer confirms that the cash drawer is in an opened status so that the control host exactly shows the real status of the cash drawer to lower the cash-loss risk.

For further understanding of the invention, reference is made to the following detailed description illustrating the embodiments and examples of the invention. The description is for illustrative purpose only and is not intended to limit the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

The present invention provides a point of sales system (POS), and the POS has a detecting device for a cash drawer. The detecting device for a cash drawer is used for detecting an opened status of the cash drawer, and makes a control host obtain a status of the cash drawer being stolen or moved. When the cash drawer is not connected, the present invention treats the status of the cash drawer as an opened status and informs a user. The cash drawer is not connected means that the connection signal between the cash drawer and the control host is interrupted.

Figure 3:
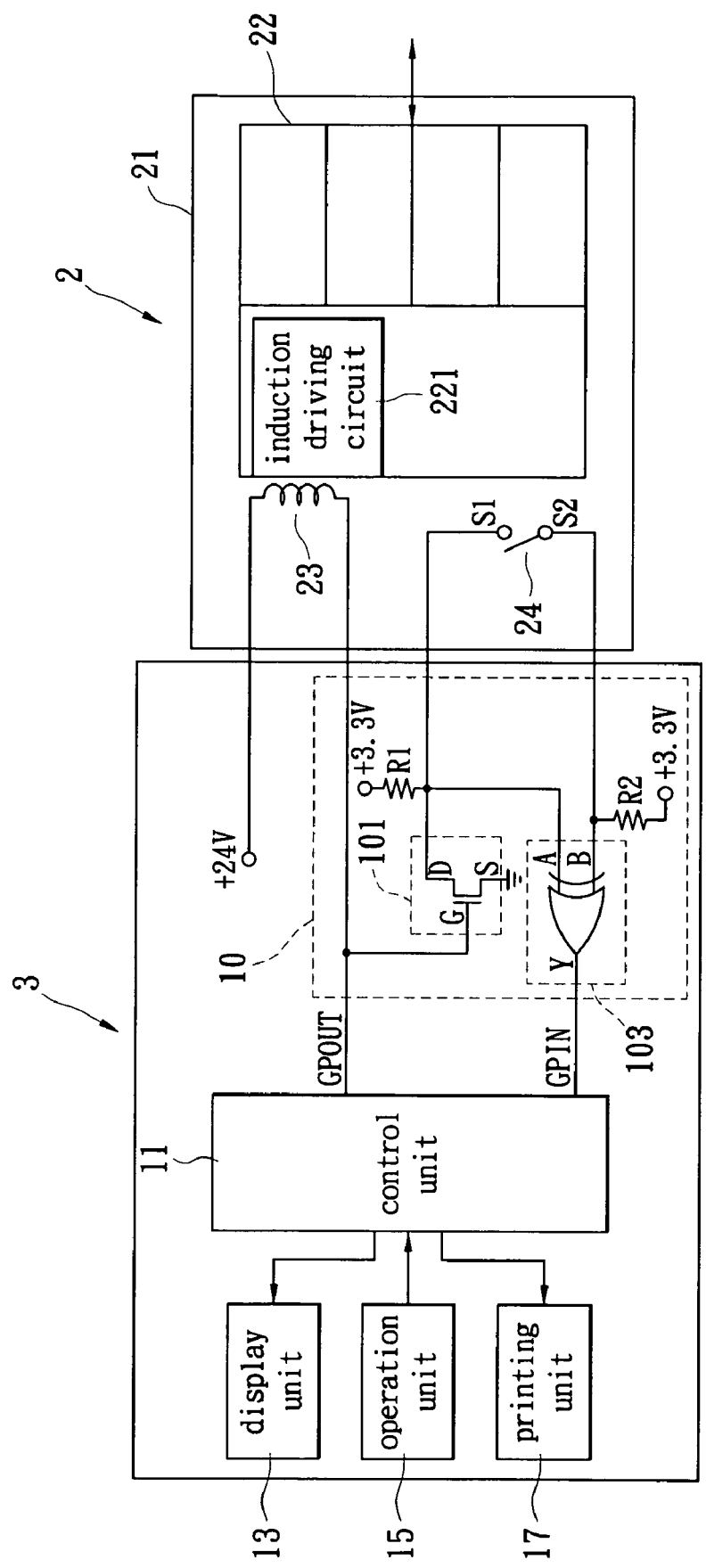
FIG. 3 is a functional block diagram of the point of sales system of the first embodiment of the present invention.

Reference is made to FIG. 3, which shows a functional block diagram of the point of sales system of the first embodiment of the present invention. The POS includes a control host 3 and a cash drawer 2. The control host 3 is used for controlling the automatic opening operation of the cash drawer 2 and performing the relative operations of the POS. A control unit 11 of the control host 3 is coupled with a display unit 13, an operation unit 15 and a printing unit 17, and controls the operations of the display unit 13, the operation unit 15 and the printing unit 17. For example, the display unit 13 displays a trade information (such as the payment for goods) and the status of the cash drawer (opened or closed). The operation unit 15 provides an interface for the user to perform the relative operations to the control host 3. The printing unit 17 prints the receipt. How to control the display unit 13, the operation unit 15 and the printing unit 17 by the control unit 11 is a known skill for the people in this field, and is not repeated again.

Furthermore, the control host 3 also detects whether the cash drawer 2 is opened or not, or whether the cash drawer 2 is connected to the control host 3 or not. The control host 3 is connected with the cash drawer 2 via a connection wire and transmits a signal. The design of the cash drawer 2 is the same as the prior art, and is not repeated again.

In this embodiment, the control host 3 is located with a detecting device for a cash drawer 10. The detecting device for a cash drawer 10 obtains the opened status of the cash drawer 2 and whether the cash drawer 2 is connected with the control host 3 via a signal detection way, and treats the status of the cash drawer 2 as an opened status when the cash drawer 2 is not connected with the control host 3. Thereby, when the cash drawer 2 is not connected with the control host 3, the status of the cash drawer 2 is the same as the status of the cash drawer 2 being opened so that the user can monitor the cash drawer 2 to check whether the cash drawer 2 is opened or stolen via the control host 3.

The detecting device for a cash drawer 10 includes a switch element 101 and an operation logic circuit 103. In one embodiment, the switch element 101 is a tree-terminals switch element, and is implemented by a metal oxide semiconductor (MOS) transistor. The switch element 101 is a MOS transistor and is used for an example to illustrate the present invention.

A first terminal G (gate) of the MOS transistor 101 is coupled with a pin GPOUT of the control unit 11 and one terminal of an electromagnetic switch 23. A second terminal D (drain) of the MOS transistor 101 is coupled with the first terminal S1 of a micro switch 24. A third terminal S (source) of the MOS transistor 101 is coupled with a grounding terminal. By utilizing the above connection relation, an operation power (+24V) provided to the electromagnetic switch 23 via the control host 3 can be fed back to the first terminal G of the MOS transistor 101 via the electromagnetic switch 23. In details, when the first terminal G of the MOS transistor 101 receives the feedback voltage flowing through the electromagnetic switch 23, it means that the cash drawer 2 is connected with the control host 3 via the connection wire.

The operation logic circuit 103 has a first input terminal A, a second input terminal B and an output terminal Y. The first input terminal A is respectively coupled with the second terminal D of the MOS transistor 101 and a first terminal S1 of the micro switch 24. The second input terminal B is coupled with a second terminal S2 of the micro switch 24. The first input terminal A and the second input terminal B of the operation logic circuit 103 are respectively coupled with voltage-drop resistors R1, R2 and inputted with a high level voltage (+3.3V). The output terminal Y of the operation logic circuit 103 is coupled with a pin GPIN of the control unit 11. The control unit 11 uses the pin GPIN to check whether the cash drawer 2 is in the opened status.

In one embodiment, the operation logic circuit 103 is an XOR gate, and is used as an example for illustrating the present invention. According to the circuit characteristic of the XOR gate 103, when the first input terminal A and the second input terminal B of the XOR gate 103 have the same logic voltage levels, the output terminal Y of the XOR gate 103 outputs a logic low level (logic Lo). When the first input terminal A and the second input terminal B of the XOR gate 103 have the different logic voltage levels, the output terminal Y of the XOR gate 103 outputs a logic high level (logic Hi).

The following illustrates how to achieve the status of the cash drawer 2 that is not connected being the same as the status of the cash drawer 2 that is opened by the detecting device for a cash drawer 10 via a signal detection way.

Figure 1:
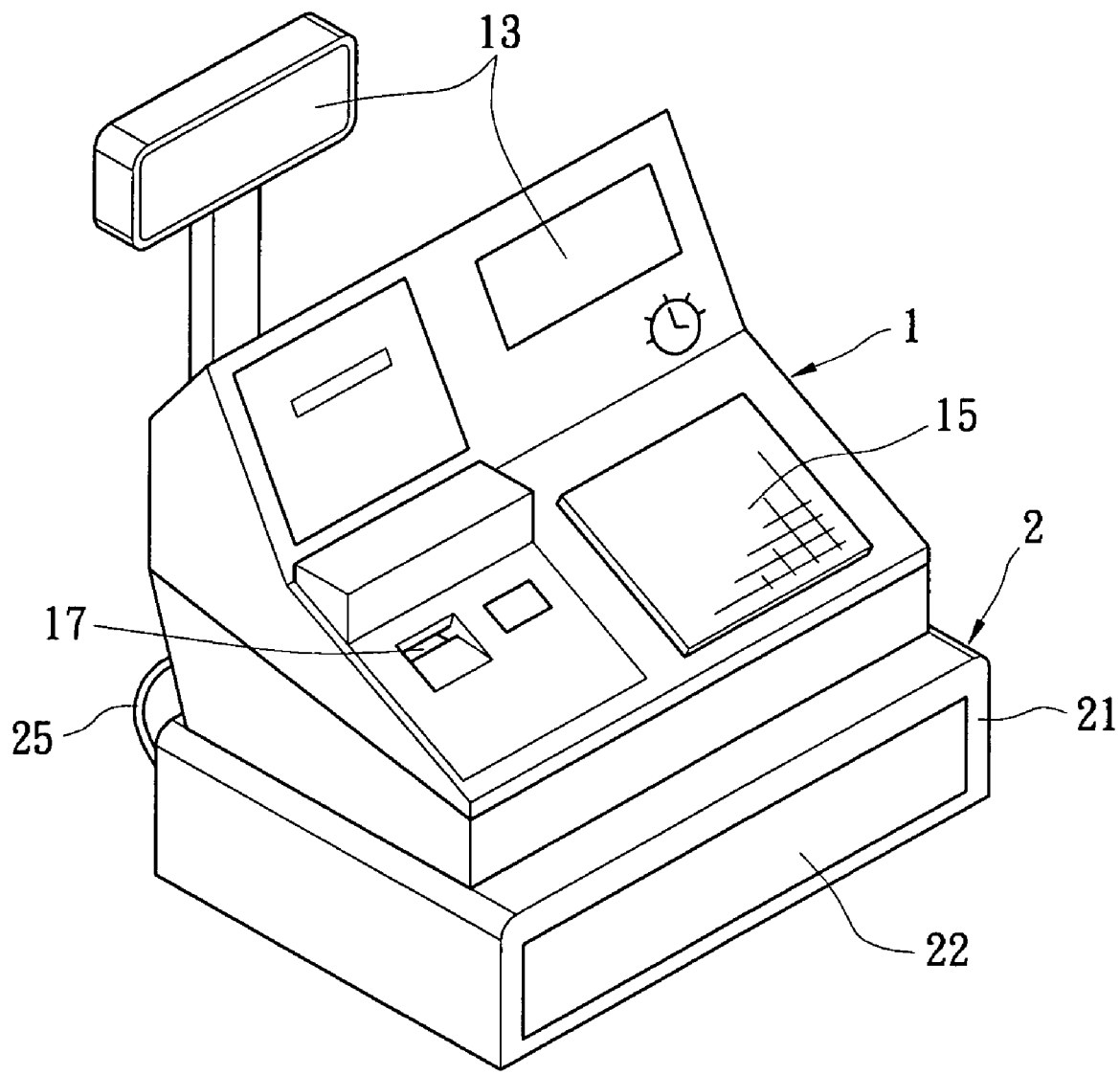
FIG. 1 is a schematic diagram of the appearance of the point of sales system of the prior art.
Figure 2:
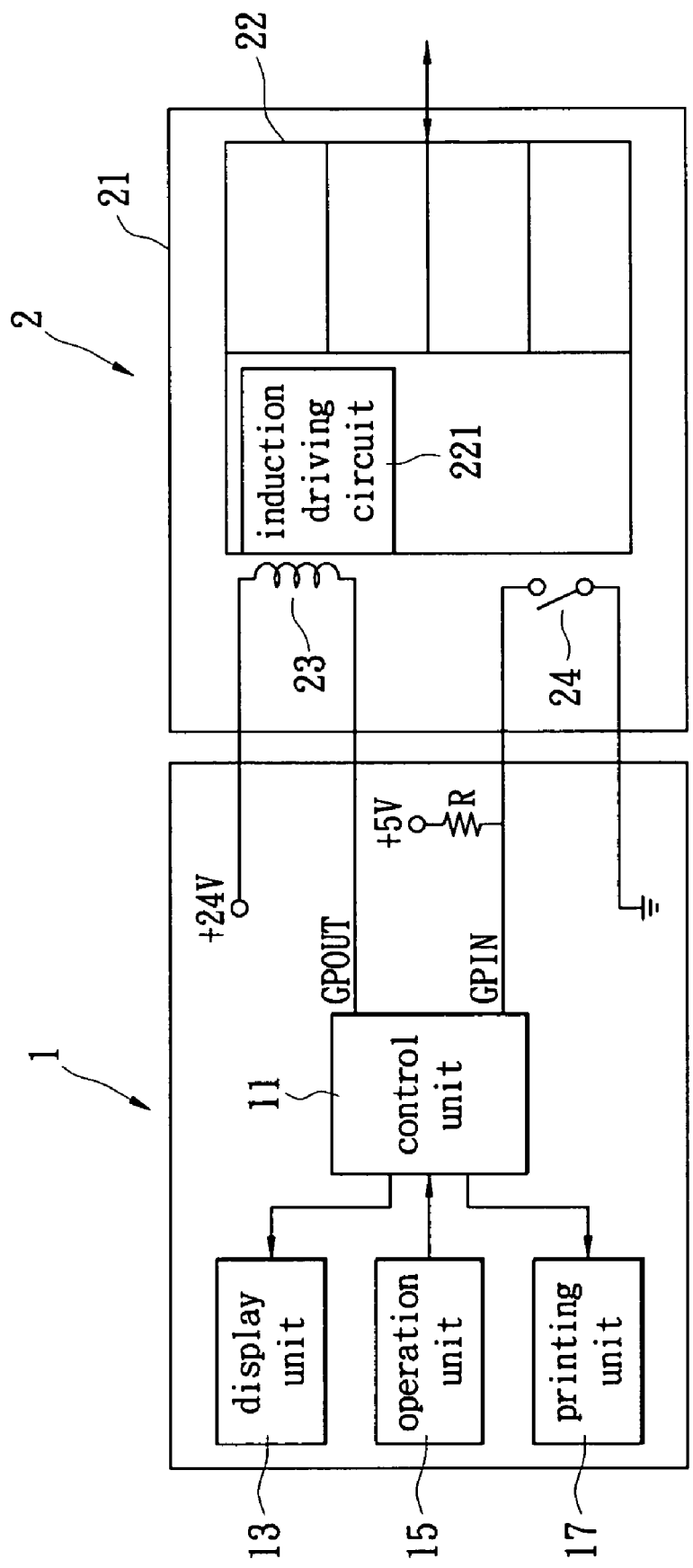
FIG. 2 is a functional block diagram of the point of sales system of the prior art.

First, when the POS operates normally, the cash drawer 2 and the control host 3 are connected together via the connection wire, as shown in FIG. 1. When the cash drawer 2 is closed, the MOS transistor 101 turns on and the first input terminal A of the XOR gate 103 is logic Lo. Because the micro switch 24 is open-circuit, the second input terminal B of the XOR gate 103 is logic Hi. Therefore, the output terminal Y of the XOR gate 103 is logic Hi. On the contrary, when the cash drawer 2 is opened, the MOS transistor 101 turns on and the first input terminal A of the XOR gate 103 is logic Lo. Because the micro switch 24 is short-circuit, the second input terminal B of the XOR gate 103 also is logic Lo. Therefore, the output terminal Y of the XOR gate 103 is logic Lo.

When the POS operates in an abnormal status, such as the cash drawer 2 is stolen or moved, the cash drawer 2 and the control host 3 are not connected by the connection wire. At this time, the MOS transistor 101 cannot obtain the feedback voltage from the electromagnetic switch 23 so that the MOS transistor 101 turns off. Therefore, the first input terminal A of the XOR gate 103 receives the +3.3V and becomes logic Hi. The second input terminal B of the XOR gate 103 also receives the +3.3V and becomes logic Hi. The output terminal Y of the XOR gate 103 is logic Lo.

In this embodiment, the control unit 11 receives the output of the XOR gate 103 via the pin GPIN. When the output terminal Y of the XOR gate 103 is logic Hi, the control unit 11 treats the status of the cash drawer 2 as the closed status. When the output terminal Y of the XOR gate 103 is logic Lo, the control unit 11 treats the status of the cash drawer 2 as the opened status or in a status of the cash drawer 2 being not connected with the control host 3. By utilizing the detecting device for a cash drawer 10, the problem of the status of the cash drawer not being shown when the cash drawer 2 is stolen is overcome.

In this embodiment, when the control unit 11 obtains the status of the cash drawer 2, such as the cash drawer 2 is closed, the cash drawer 2 is opened, the cash drawer 2 is connected with the control host 3, or the cash drawer 2 is not connected with the control host 3, the control unit 11 also drives the display unit 13 to show the status of the cash drawer 2 via text, or symbol.

Figure 4:
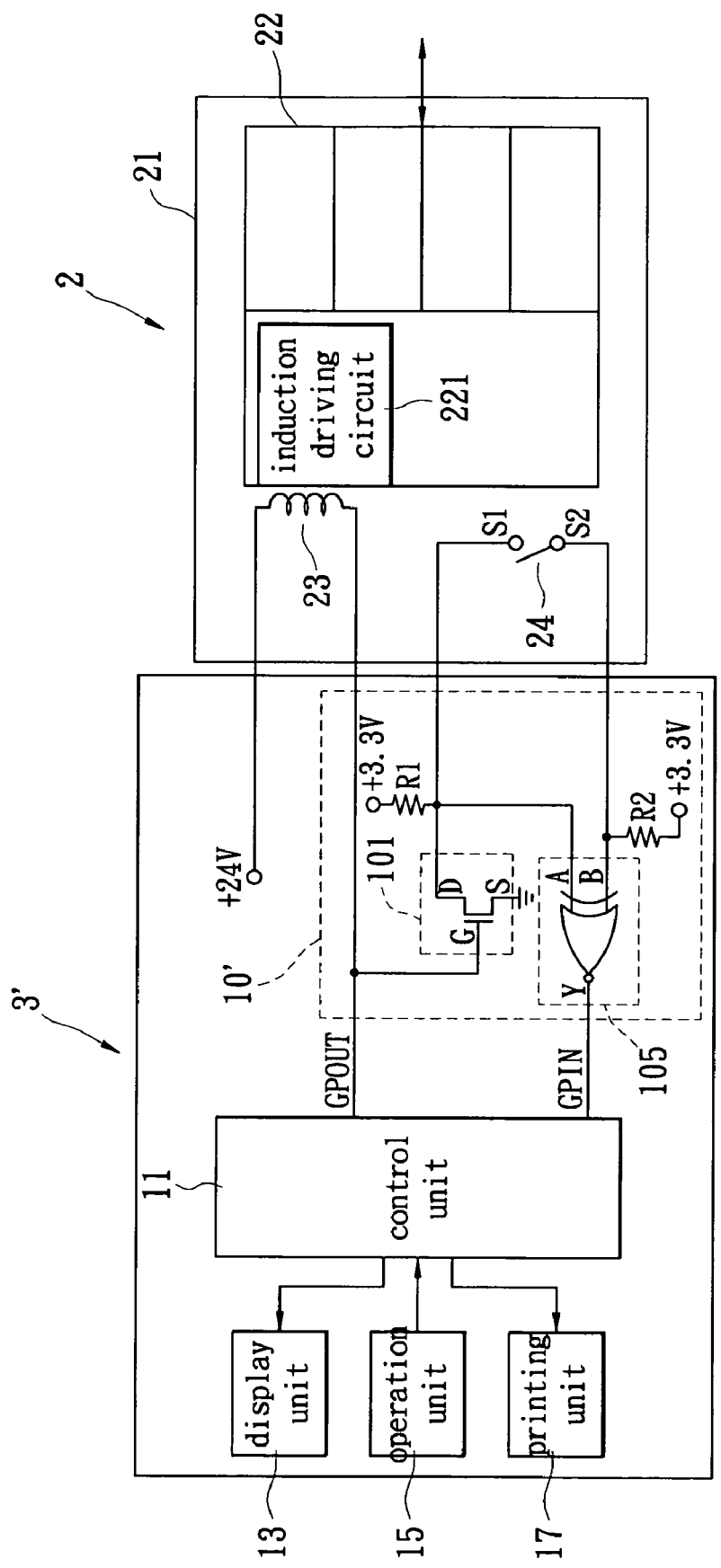
FIG. 4 is a functional block diagram of the point of sales system of the second embodiment of the present invention.

Reference is made to FIG. 4, which shows a functional block diagram of the point of sales system of the second embodiment of the present invention. The operation logic circuit 105 of the detecting device for a cash drawer 10' in FIG. 4 is implemented by an XNOR gate. When a first input terminal A and a second input terminal B the XNOR gate 105 have the same logic voltage levels, an output terminal Y of the XNOR gate 105 outputs a logic high level (logic Hi). When the first input terminal A and the second input terminal B of the XNOR gate 105 have the different logic voltage levels, the output terminal Y of the XNOR gate 105 outputs a logic low level (logic Lo). The operation of the detecting device for a cash drawer 10' in FIG. 4 is the same as FIG. 3, and is not repeated again.

The control unit 11 in FIG. 4 receives the output of the XNOR gate 105 via the pin GPIN. When the output terminal Y of the XNOR gate 105 is logic Hi, the control unit 11 treats the status of the cash drawer 2 as the opened status. When the output terminal Y of the XNOR gate 105 is logic Lo, the control unit 11 treats the status of the cash drawer 2 as the closed status. By utilizing the detecting device for a cash drawer 10', the status of the cash drawer 2 that is not connected is the same as the status of the cash drawer 2 is opened.

The present invention has a detecting device for a cash drawer on the control host, and uses the detection result of the detecting device for a cash drawer to represent the status of the cash drawer, such as the opened status of the cash drawer 2 represents the cash drawer 2 is opened or the cash drawer 2 is not connected with the control host. Therefore, when the cash drawer 2 is stolen, the control host can obtain the status of the cash drawer being opened via the detecting device for a cash drawer to prevent the cash from being stolen.

The operation logic circuit can be implemented by two ways. However, these two embodiments have the same characteristic. When the first input terminal and the second input terminal of the operation logic circuit have the same logic voltage levels, the output terminal of the operation logic circuit outputs a first logic level. When the first input terminal and the second input terminal of the operation logic circuit have different logic voltage levels, the output terminal of the operation logic circuit outputs a second logic level. The first logic level is a logic status that is opposite to the logic status of the second logic level. The first logic level represents the cash drawer is opened or is not connected. The second logic level represents the cash drawer is closed.

Moreover, because the detecting device for a cash drawer is located in the control host, the cash drawer 2 does not need to be modified, and the connection interface between the control host and the cash drawer also does not need to be modified.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A detecting device for a cash drawer, wherein the cash drawer has an electromagnetic switch and a micro switch and is connected to a control host via a connection wire to obtain operation power for the electromagnetic switch and to receive a signal to drive and enable the electromagnetic switch to automatically open the cash drawer, wherein when the cash drawer is automatically opened the micro switch is short-circuited, when the cash drawer is closed the micro switch is open-circuited, and the detecting device for the cash drawer is located in the control host, comprising:

an operation logic circuit having a first input terminal, a second input terminal and an output terminal, wherein the first input terminal is coupled with a first terminal of the micro switch, the second input terminal is coupled with a second terminal of the micro switch, and each of the first input terminal and the second input terminal is supplied with a high level voltage; and a switch element, which is coupled between the electromagnetic switch and the first input terminal, having a first terminal coupled with the electromagnetic switch, a second terminal coupled with the first input terminal of the operation logic circuit, and a third terminal serving as a grounding terminal, wherein when the cash drawer is opened in response to the signal outputted from the control host and is connected to the host controller via the connection wire a conduction of the switch element, which is achieved by the switching element obtaining the operation power via the electromagnetic switch, causes the switch element to output a low level voltage to the first input terminal of the operation logic circuit, when the cash drawer is disconnected from the control host, the switch element is turned off, outputting the high level voltage to the first input terminal of the operation logic circuit, and when the cash drawer is connected to the host controller and is closed the conduction of the switch element causes the first input terminal of the operation logic circuit to receive the low level voltage;

wherein, when the detecting device and the cash drawer is disconnected or the cash drawer is opened when the detecting device and the cash drawer are connected both the first input terminal and the second input terminal receive voltages of a same logic voltage level, and the operation logic circuit outputs a voltage of a first logic level to the output terminal, and when the detecting device and the cash drawer is connected and the cash drawer is closed the first input terminal and the second input terminal receive the voltages of different logic voltage levels, and the operation logic circuit outputs a voltage of a second logic level to the output terminal.

2. The detecting device for a cash drawer as claimed in claim 1, wherein the operation logic circuit is an XOR gate or an XNOR gate.

3. The detecting device for a cash drawer as claimed in claim 1, wherein a logic status of the first logic level is opposite to a logic status of the second logic level.

4. The detecting device for a cash drawer as claimed in claim 1, wherein the switch element is a MOS transistor.

5. The detecting device for a cash drawer as claimed in claim 4, wherein the first terminal is a gate terminal of the MOS transistor, the second terminal is a drain terminal of the MOS transistor, and the third terminal is a source terminal of the MOS transistor.

* * * * *